Nov. 17, 1925.                                                                              1,561,637
J. CASH
MEANS FOR SUPPORTING THE MOLDING BOX OR PATTERN
PLATE OF FOUNDRY MOLDING MACHINES
Filed April 3, 1924
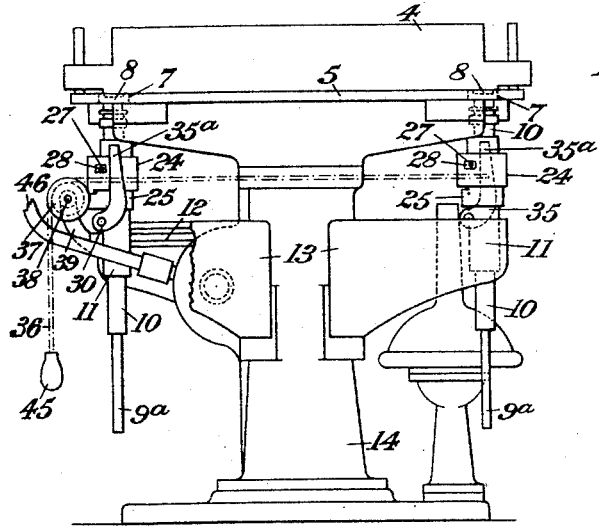
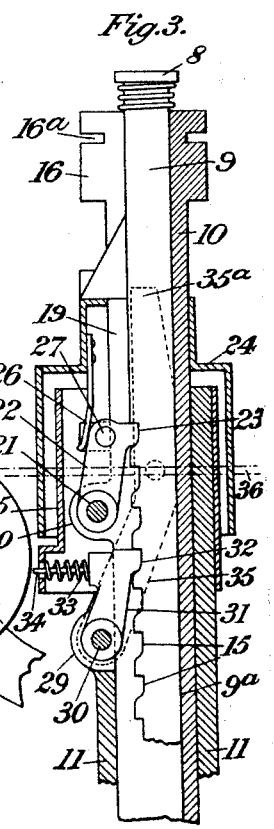
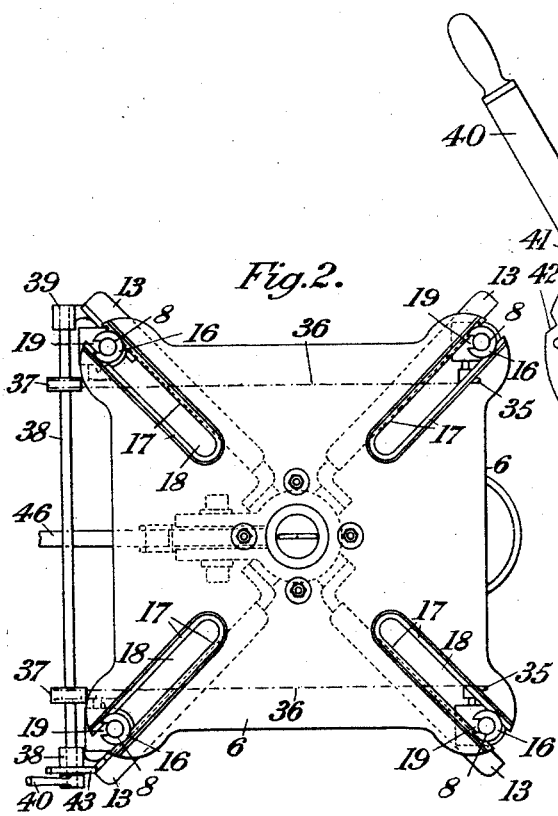
Inventor:—
Joseph Cash
by George E. Folkes.
his Attorney Patented Nov. 17, 1925.

1,561,637

UNITED STATES PATENT OFFICE.

JOSEPH CASH, OF TIPTON, ENGLAND.

MEANS FOR SUPPORTING THE MOLDING BOX OR PATTERN PLATE OF FOUNDRY MOLDING MACHINES.

Application filed April 3, 1924. Serial No. 704,036.

*To all whom it may concern:*

Be it known that JOSEPH CASH, a subject of the King of Great Britain, residing at Horseley Heath, Tipton, in the county of Stafford, England, has invented a new and useful Improved Means for Supporting the Molding Box or Pattern Plate of Foundry Molding Machines; and he does hereby declare the following to be a full, clear, and exact description of the same.

This invention has reference to an improved means for supporting the molding box or pattern plate of a foundry molding machine in the raised position when it is desired to remove the pattern therefrom or for other purposes. This improved mechanism can be employed with various types of molding machines which are combined with a jar ramming device controlled by a lever or hand wheel for the purpose of effecting a consolidation of the sand within the mold by a jar ramming operation.

The invention consists of means for supporting the molding box or pattern plate of a foundry molding machine and consists of a plurality of rods which are vertically slidable within and through the molding plate or table, the said rods being automatically maintained in their raised position by means of catches when the rods are raised, the upper ends of the said rods being disposed within recesses formed in the molding plate or table in such a manner that they always form part of the support of the molding box or pattern plate even during the ordinary ramming operations of the molding machine. The invention further resides in improved means for supporting the molding box or pattern plate of a foundry molding machine and comprises a plurality (say four) of rods which are vertically slidable within and through the molding plate or table, the said rods being maintained in their raised position by means of a plurality of sets of catches, one set of which maintains the rods in their raised position relative to slidable sleeves with which the said rods reciprocate during ramming operations, the other set of catches maintaining the rods in their raised position when the molding machine is at rest.

The invention will now be described with particular reference to the accompanying sheet of drawings which illustrate the invention as applied to a jar ram molding machine of known construction.

In the drawings:—

Fig. 1 is a side elevation of a jar ram molding machine of known construction having the invention embodied therewith, part of the machine being broken away the better to disclose the details of construction.

Fig. 2 is a plan of the molding machine seen in Fig. 1 with the molding box and molding plate removed therefrom, and

Fig. 3 is a part sectional elevation to an enlarged scale showing the means of controlling and maintaining the molding box supporting rods.

In the preparation of a mold, the molding box 4 rests on a molding plate 5 on which the pattern is placed, said molding plate 5 being supported on a molding table 6 bolted to the head of the ram of a jar ram molding machine. This molding plate 5 is provided with four circular holes 7, one near each corner of the plate, said holes 7 being adapted to receive the sylindrical heads 8 of the rods 9 by which the molding box 4 is wholly supported when in its raised position above the molding plate 5 as will hereinafter be more fully described. The shanks 9ª of the rods 9 are slidably mounted within sleeves 10, which in turn are slidably mounted within guide brackets 11 which are secured to and adjustable along guide ways 12 formed in diagonally disposed supporting arms 13 which are secured to and radiate from the pedestal 14 of the molding machine. The sections 9ª of the rods 9 are formed with a series of notches or teeth.

The sleeves 10 are formed at their upper ends with recessed heads 16, the annular recesses 16ª in which are adapted to accommodate slideways 17 formed in the walls of diagonally arranged slots 18 cut in the molding table 6. The sleeves 10 are each provided with a vertical slot 19 which extends the whole or substantially the whole length of the sleeve 10, and at a point about midway in their length the walls of the slots 19 are provided with bosses 20 within which are formed bearings for spindles 21. These spindles 21 have mounted thereon pawls 22 which are provided with projecting nibs 23 adapted for engagement within the notches 15, the said pawls 22 being located within the slots 19. The sleeves 10 and their respective guide brackets 11 are each provided with telescopic sheet metal guards 24, 25, the upper set of guards 24 being secured to the sleeves 10, and the lower set 25 to the guide brackets 11. Leaf springs 26 are secured to the inner periphery of the guards 24, the free ends of the springs bearing against the heads of the pawls 22 and normally maintaining them in engagement within the notches 15. These pawls 22 are provided in their heads with pins 27 which project through apertures 28 in the guards 24 and 25, the apertures 28 being such as to permit of radial motion of the pins 27. Each of the guide brackets 11 is provided with bosses 29 which serve as bearing brackets for spindles 30, on which are mounted a second set of pawls 31 having thereon projecting nibs 32, which project through the slots 19 in the sleeves 10 and normally engage within the notches 15. These pawls 31 are maintained in their normal position within the notches 15 by means of coil springs 33 which are mounted about guide rods 34 secured to the pawls 31, the springs being disposed between the heads of the pawls 31 and the inner surfaces of the guards 25.

Secured to the spindle 30 are upwardly projecting arms 35 the upper portions 35ª of which are bent or cranked and adapted to contact with the projecting pins 27 on the pawls 22. Each of the arms 35 has a chain 36 secured thereto said chains 36 passing over chain wheels 37 mounted on a shaft 38 carried by brackets 39 disposed on either side of the front of the machine. An operating lever 40 is secured to the shaft 38, said lever 40 being provided with a spring controlled plunger 41 which is adapted to engage within one or other of three V notches 42 cut in the periphery of a disc 43 secured to one of the bearing brackets 39, limiting pins 44 being disposed on either side of the outer notches 42 to limit the motion of the operating lever 40. The chains 36 are maintained in tension by means of weights 45 secured to the free ends thereof.

The operation of the machine is as follows: The molding box 4 molding plate 5 and molding table 6 being presumed to be in the lowermost position and the molding box ready to be lifted from off the molding plate as seen in Figure 1. The operating lever 40 is placed in the first notch 42 this permits the pawls 22 and 31 to engage within the notches 15 under the influence of their respective springs 26 and 33, in this position the pawls 22 and 31 constituting ordinary one-way pawls. The jar ram operating lever 46 is actuated to raise the molding table 6 and the load thereon namely the molding box 4 and molding plate 5 and when in the fully raised position the pawls 22 and 31 engage in their respective notches 15 and thereby support the rods 9. The jar ram operating lever 46 is then actuated to lower the ram and hence the molding table 6, and by reason of the engagement of the slideways 17 thereon within the recesses 16ª in the heads of the sleeves 10 the said sleeves are lowered with the molding table 6, the pawls 22 permitting movement of the sleeves 10 relative to the rods 9. The molding plate 5 descends with the molding table 6 the rods 9 projecting through the holes 7 therein and maintaining the molding box free of the molding plate. In this position the rods are supported by the pawls 31 and also when the sleeves 10 have been lowered by the pawls 22 which re-engage with the notches 15.

To lower the rods 9 for a subsequent operation of the machine the lever 40 is moved into the lowest of the V notches 42 this operation through the chains 36 effects the rotation of the arms 35 on their spindles 30. The initial movement of the spindles 30 causes the pawls 31 to be disengaged from the notches 15 and the continued movement of the lever 40 causes the arms 35 to bear against the projecting pins 27 on the pawls 22 thereby rocking the said pawls about their spindles and freeing them from engagement with the notches 15 and permitting the rods 9 to fall into their lowest position, coil springs 47 disposed about the rods 9 and below the heads 8 serve to absorb the shock of the falling rods.

To permit the jar ramming operation the lever 40 is moved into the second of the V notches 42 in this position the lower set of pawls 31 which support the rods 9 relative to the guide brackets 11 are withdrawn and thus motion of the sleeves 10 and the rods 9, which are supported by the pawls 22 which are left in engagement within the notches 15, is permitted within the guide brackets 11 and hence permitting of the jar ramming operation proceeding.

It will be clear that modifications can be made in the disposition of the parts constituting the mechanism hereinbefore described according to the particular type of machine to which the present invention is applied, for example it may be found that the series of pawls 22 may be dispensed with where it is only desired to effect a lifting operation or again other means of controlling the position of the pawls than that of the hand lever 40 and chain 36 connected to the arms 35 may be employed.

Claims:

1. In a jar ram molding machine, a pedestal, a molding table, guide members adjustably mounted in said pedestal, sleeve members adapted for reciprocation within said guide members and with said table, a plurality of notched rods constituting the molding box support and adapted for a vertical motion within said sleeve members, means for supporting said rods relative to said sleeve members during the reciprocation thereof, means for supporting said rods in their fully raised position and means for withdrawing one or both of said rod supporting means.

2. In a jar ram molding machine, a pedestal, a molding table, guide members adjustably mounted in said pedestal, sleeve members adapted for reciprocation within said guide members and with said table, a plurality of notched rods constituting the molding box support and adapted for vertical motion within said sleeve members, a plurality of catches pivotally mounted in said sleeve members and adapted to engage said notched rods, a plurality of catches pivotally mounted on said guide members and adapted to engage said rods, and means for withdrawing one or both of said sets of catches from engagement with said rods.

3. In a jar ram molding machine, a pedestal, a molding table, guide members adjustably mounted in said pedestal, sleeve members adapted for vertical reciprocation within said guide members and connected with the molding table, a plurality of notched rods constituting the molding box support and adapted for a vertical motion within said sleeve members, a plurality of spring controlled catches pivotally mounted on said sleeve members and adapted to engage said rods, a plurality of spring controlled catches pivotally mounted on said guide members and adapted to engage said rods, a cover connected to said sleeve members, a cover connected to said guide members and adapted to telescope within said first mentioned cover, shock absorbing means between said rods and said sleeve members, and means for withdrawing one or both of said sets of catches from engagement with said rods.

In testimony whereof, I have signed my name to this specification.

JOSEPH CASH.